United States Patent
Feng et al.

(10) Patent No.: US 11,687,977 B2
(45) Date of Patent: Jun. 27, 2023

(54) SYSTEM AND METHOD FOR PREDICTING CUSTOMER LIFETIME VALUE USING TWO-STAGE MACHINE LEARNING

(71) Applicant: Beijing Wodong Tianjun Information Technology Co., Ltd., Beijing (CN)

(72) Inventors: Xiaotao Feng, Mountain View, CA (US); Shengwei Tang, San Jose, CA (US); Di Wu, Mountain View, CA (US); Fanlong Meng, Fremont, CA (US); Yi Zhang, San Jose, CA (US)

(73) Assignee: Beijing Wodong Tianjun Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/515,257

(22) Filed: Oct. 29, 2021

(65) Prior Publication Data
US 2023/0136809 A1    May 4, 2023

(51) Int. Cl.
*G06Q 30/0251* (2023.01)
*G06Q 30/0242* (2023.01)
*G06N 5/01* (2023.01)

(52) U.S. Cl.
CPC .......... *G06Q 30/0271* (2013.01); *G06N 5/01* (2023.01); *G06Q 30/0242* (2013.01); *G06Q 30/0255* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,825,034 | B2 * | 11/2020 | Shen | .................. G06Q 30/0277 |
| 10,832,260 | B2 * | 11/2020 | Shen | ...................... G06N 20/00 |
| 2004/0138958 | A1 * | 7/2004 | Watarai | .............. G06Q 30/0202 |
| | | | | 705/7.31 |

(Continued)

FOREIGN PATENT DOCUMENTS

WO    WO-2017219121 A2 * 12/2017 ............. G06N 20/00

OTHER PUBLICATIONS

Harman, D. M. (2016). Stochastic process customer lifetime value models with time-varying covariates (Order No. 10241178). Available from ProQuest Dissertations and Theses Professional. (1879672204). (Year: 2016).*

(Continued)

*Primary Examiner* — Marie P Brady
(74) *Attorney, Agent, or Firm* — Scully, Scott, Murphy & Presser, P.C.

(57) ABSTRACT

A method and a system for predicting and using customer lifetime value (CLV). The method include: providing a classifier trained using customer feature data during a first period of time as input and whether there is spending during a second period of time as classifier label; providing a regressor trained using the customer feature data during the first period of time as input and amount of spending during a second period of time as regressor label; performing the classifier using customer feature data during a third period of time to obtain customers having positive predicted classifier labels; and performing the regressor using the customer feature data during the third period of time for the customers having positive predicted classifier labels, to obtain CLVs of the customers.

20 Claims, 8 Drawing Sheets

(56) References Cited

U.S. PATENT DOCUMENTS

| | | | | |
|---|---|---|---|---|
| 2015/0317652 | A1* | 11/2015 | Seth | G06F 16/23 705/7.33 |
| 2018/0130091 | A1* | 5/2018 | Rae | G06Q 30/0246 |
| 2018/0218376 | A1* | 8/2018 | Shen | G06N 5/04 |
| 2018/0218383 | A1* | 8/2018 | Shen | G06Q 10/06315 |

OTHER PUBLICATIONS

T. T. Win and K. S. Bo, "Predicting Customer Class using Customer Lifetime Value with Random Forest Algorithm," 2020 International Conference on Advanced Information Technologies (ICAIT), 2020, pp. 236-241, doi: 10.1109/ICAIT51105.2020.9261792. (Year: 2020).*

Y. Chen, C. Fu and H. Zhu, "A Data Mining Approach to Customer Segment Based on Customer Value," 2008 Fifth International Conference on Fuzzy Systems and Knowledge Discovery, Jinan, China, 2008, pp. 513-517, doi: 10.1109/FSKD.2008.548. (Year: 2008).*

T. T. Win and K. S. Bo, "Predicting Customer Class using Customer Lifetime Value with Random Forest Algorithm," 2020 International Conference on Advanced Information Technologies (ICAIT), Yangon, Myanmar, 2020, pp. 236-241, doi: 10.1109/ICAIT51105.2020.9261792. (Year: 2020).*

Harman, D. M. (2016). Stochastic process customer lifetime value models with time-varying covariates (Order No. 10241178). Available from ProQuest Dissertations and Theses Professional. (1879672204). Retrieved from https://dialog.proquest.com/professional/docview/1879672204?accountid=131444 (Year: 2016).*

* cited by examiner

|  | MAE (the lower the better) | Spearman Correlation (the higher, the better) |
|---|---|---|
| Two-stage system | 0.52 | 0.92 |
| Single step system | 0.66 | 0.7 |

FIG. 7

SYSTEM AND METHOD FOR PREDICTING CUSTOMER LIFETIME VALUE USING TWO-STAGE MACHINE LEARNING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to e-commerce, and more particularly to systems and methods for accurately predicting customer lifetime value (CLV) based on two-stage machine learning and using the CLV in customer management and marketing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The customer lifetime value (CLV) represents the total amount of money a customer is expected to spend in the business during their lifetime. Different from historic customers' profitability, CLV is a forward-looking concept. Knowing CLV helps businesses develop strategies to acquire new customers, retain existing ones, or designing marketing campaigns. However, it is very difficult to accurately predict CLV. This is especially true in the case of the e-commerce scenario, where millions of customers have millions of purchase and consumption habits.

Therefore, an unaddressed need exists in the art to address the aforementioned deficiencies and inadequacies.

SUMMARY

In certain aspects, the present disclosure relates to a method for predicting customer CLV values and using the CLV values for marketing and customer retaining services. In certain embodiments, the method includes:

providing a classifier of a computing device, wherein the classifier is trained using customer feature data of a first plurality of customers during a first period of time as input and whether there are spendings of the first plurality of customers during a second period of time as classifier labels;

providing a regressor of the computing device, wherein the regressor is trained using customer feature data of a second plurality of customers during the first period of time as input and amount of spendings of the second plurality of customers during the second period of time as regressor labels, wherein the second plurality of customers is a subset of the first plurality of customers, and the amount of spending of each of the second plurality of customers during the second period of time is positive;

performing the classifier using customer feature data of a third plurality of customers during a third period of time to obtain predicted classifier labels;

obtaining a fourth plurality of customers, the predicted classifier labels of the fourth plurality of customers being positive; and performing the regressor using the customer feature data of the fourth plurality of customers during the third period of time to obtain predicted regressor labels, the predicted regressor label being CLVs of the fourth plurality of customers.

In certain embodiments, when the predicted classifier labels of the customers is 0, the method defines the CLVs of the customers as 0. Those customers having CLVs of 0 are the customers belong to the third plurality of customers, but are not the fourth plurality of customers.

In certain embodiments, the first period of time is earlier than the second period of time and the third period of time. The second period of time may be the same or earlier than the third period of time. In certain embodiments, there is no overlap between the first period of time and the second and third period of times, and there is overlap between the second period of time and the third period of time.

In certain embodiments, the classifier is performed using Random Forrest, and the regressor is performed using Gradient Boosting Decision Tree (GBDT).

In certain embodiments, the method further includes sending, by the computing device, a promotion package to a predefined percentage of the fourth plurality of customers having the lowest CLV. In certain embodiments, the predefined percentage is 10%. In certain embodiments, the predefined percentage may vary in a range of 1% to 30%. In certain embodiments, the method may further send the promotion package to the customers having the CLVs of 0.

In certain embodiments, the method further includes presenting an advertisement to a portion of the fourth plurality of customers that have a predefined range of CLVs. In certain embodiments, the predefined range is top 20% of CLVs when the advertisement is a luxury brand, and the predefined range is 50%-55% of CLVs when the advertisement is a brand targeting youth.

In certain embodiments, the customer feature data is prepared from transaction log, browse log, click log, cart log, demographic information, and indirect features of the customers. In certain embodiments, the preparation comprises aggregation and normalization of spendings from the transaction log, aggregation of a number of transactions from the transaction log, a number of browses from the browse log, a number of clicks from the click log, a number of add-to-cart actions from the cart log, and encoding of shipping address, gender, and age from the demographic information. In certain embodiments, the aggregation comprises summation of the number of transactions, the number of browses, the number of clicks, and the number of add-to-cart actions in a time of a month, a season, and a year. In certain embodiments, the customer feature data is in a form of a vector, each dimensions of the vector representing a customer feature. In certain embodiments, the number of the dimensions is in a range of 200-300.

In certain aspects, the present disclosure relates to a system. In certain embodiments, the system includes a computing device. The computing device has a processor and a storage device storing computer executable code. The computer executable code, when executed at the processor, is configured to:

provide a classifier of a computing device, wherein the classifier is trained using customer feature data of a first plurality of customers during a first period of time as input and whether there are spendings of the first plurality of customers during a second period of time as classifier labels;

provide a regressor of the computing device, wherein the regressor is trained using customer feature data of a second plurality of customers during the first period of time as input and amount of spendings of the second plurality of customers during a second period of time as regressor labels, wherein the second plurality of customers is a subset of the first plurality of customers, and the amount of spending of each of the second plurality of customers during the second period of time is positive;

perform the classifier using customer feature data of a third plurality of customers during a third period of time to obtain predicted classifier labels;

obtain a fourth plurality of customers, the predicted classifier labels of the fourth plurality of customers being positive; and perform the regressor using the customer feature data of the fourth plurality of customers during the third period of time to obtain predicted regressor labels, the predicted regressor labels being customer lifetime values (CLVs) of the fourth plurality of customers.

In certain embodiments, the classifier is performed using Random Forrest, and the regressor is performed using Gradient Boosting Decision Tree (GBDT).

In certain embodiments, the computer executable code is further configured to send a promotion package to 10% of the fourth plurality of customers having the lowest CLVs.

In certain embodiments, the computer executable code is further configured to present an advertisement of a luxury brand to a portion of the fourth plurality of customers that have top 20% of the CLVs, or present an advertisement targeting youth to a portion of the fourth plurality of customers having 50%-55% of the CLVs.

In certain embodiments, the customer feature data is prepared from transaction log, browse log, click log, cart log, demographic information, and indirect features of the customers. In certain embodiments, the preparation comprises aggregation and normalization of spendings from the transaction log, aggregation of a number of transactions from the transaction log, a number of browses from the browse log, a number of clicks from the click log, a number of add-to-cart actions from the cart log, and encoding of shipping address, gender, and age from the demographic information. In certain embodiments, the aggregation comprises summation of the number of transactions, the number of browses, the number of clicks, and the number of add-to-cart actions in a time of a month, a season, and a year.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 7 schematically depicts a comparison between a two-stage customer lifetime value prediction system and a one-step customer lifetime value prediction system according to certain embodiments of the present disclosure.

DETAILED DESCRIPTION

Figure 1:
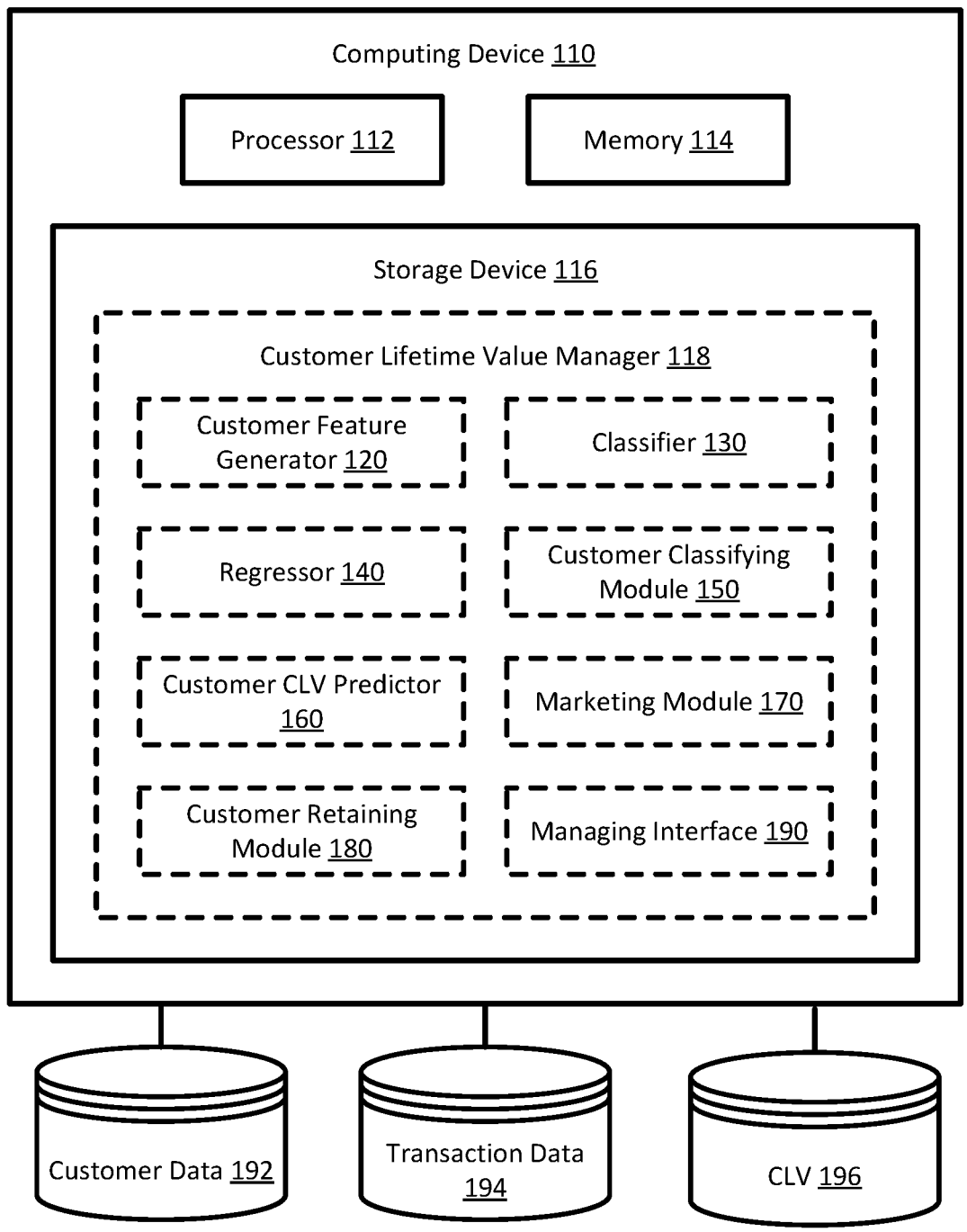
FIG. 1 schematically depicts a customer lifetime value management system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "plurality" means two or more. As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term "user" may be used exchangeable with "customers," who is a consumer of an e-commerce platform or a business.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In certain aspects, the present disclosure may use two broad approaches to modeling the CLV prediction problem: probabilistic models and machine learning (ML). Probabilistic models work by fitting a probability distribution to the observed RFM (Recency, Frequency, and Monetary value) values for customers. These models are based solely on order information that's defined by the transaction history for each customer. Each order consists of a customer ID, an order date, and an order value. The machine learning based systems are an extensive, widely used class of statistical models in which the parameters are fitted to the data by training with gradient descent. Some several different methods or algorithms have been employed in each of the two approaches. The machine learning approaches perform slightly better since they make use of more data features than the probabilistic models. However, the main disadvantage of the traditional ML model is that it cannot distinguish inactive customers from active customers very well. To this end, ML based systems perform also poorly in terms of mean absolute error (MAE) and Spearman's rank correlation coefficient.

In certain aspects, in order to predict CLV accurately, the present disclosure presents an innovative system design to prediction lifetime value for retail customers leveraging stored massive customer activity data and large-scale machine learning systems. This method is a two-stage machine learning-based CLV prediction system which first distinguishes active customers from the entire customer base, then predicts the accurate CLV of the active ones. This system significantly improves the CLV prediction accuracy measured by both MAE and Spearman's rank correlation coefficient.

Comparing to the probabilistic model approaches mentioned above, the two-stage machine learning-based system exploits more than two hundred features (include but not limited to transactions, browses, clicks, add cart, and demographic features) to understand customers' historical behavior and information comprehensively. The features are collected from the customers' interaction with the e-commerce retailer during their shopping visits, including but not limited to, orders, clicks, logins, browses, etc. The disclosure then goes one step beyond the simple ML models to employ a two-stage structure to further improve prediction accuracy. In particular, the first stage is a binary classifier that identifies active customers from the entire customer base. This step is especially critical in the e-commerce scenario since e-commerce platforms usually have a huge registered customer base comparing to the actual active ones. Among the entire customer base, more than half of them only have some browsing activities or purchased something long time ago. They are unlikely to come to the platform to shop in the future. If the disclosure does not separate them first, it will often result in large forecast errors which is also the problem with other traditional methods. Through the first stage, the system directly gives a zero CLV to the customers who are predicted to be inactive and passes the active customer to the second stage for prediction. The second stage is a regressor which predicts the value for the active customers. The evaluation shows that the two-stage system significantly improves both MAE and Spearman's rank correlation coefficient of CLV prediction.

Briefly, the system of the disclosure is a two-stage machine learning-based CLV prediction system which includes feature collection and generation pipeline, a classifier generation pipeline, a regressor generation pipeline, and a prediction pipeline. The feature collection and generation pipeline provide customer's features and store them in database. Given the feature data from the entire customer base, the disclosure adopts Random Forrest (RF), a bootstrap aggregating method in ensemble supervised learning, to generate a classifier. The main purpose of the classifier stage is to identify which customer will be active (purchase in the future). Given the feature data from the customers who made at least one transaction, the disclosure adopts Gradient Boosting Decision Tree (GBDT), a boosting algorithm in ensemble supervised learning, to generate a regressor. The main purpose of the regressor is to predict the precise value for each customer. For the CLV prediction procedures, the disclosure first retrieve feature data for the customers to be predicted. Then the disclosure predicts if the customer will be active or not through the first stage (classifier). According to the first prediction result, the disclosed system directly gives a zero CLV to the customers who are predicted to be inactive and passes the active customer to the second stage (regressor). At the second stage, the regressor predicts a precise CLV value to each customer. Overall, all the customers will be predicted a CLV (either zero or a positive value).

FIG. 1 schematically depicts a two-stage CLV prediction system according to certain embodiments of the present disclosure. As shown in FIG. 1, the system 100 includes a computing device 110, customer data 192, transaction data 194, and CLV 196. In certain embodiments, the computing device 110 may be a server computer, a cluster, a cloud computer, a general-purpose computer, or a specialized computer, which provides management of the customer loyalty program. In certain embodiments, the computing device 110 may communicate with other computing devices or services, so as to obtain customer data, transaction data, and product data from those computing devices. In certain embodiments, the communication is performed via a network, which may be a wired or wireless network, and may be of various forms, such as a public network and a private network, or via non-transitory computer media including but not limited to flash drive, USB drives, hard drive, floppy disk, SD card, optical drive, or any other portable data storage media.

The customer data 192 is accessible by the computing device 110, and stores a customer's information and his activities on an e-commerce platform. For each customer, the customer data 192 may include, for example, demographic information such as residency, gender, age, occupation, and shipping address of the customer; login log recording the customers' login on the e-commerce platform; browse log recording customers' browsing history on the e-commerce platform; search log recording the search history of the customers; click log recording customers' clicking history on the e-commerce platform, cart log recording add-to-cart history of the customers; and indirect features that are derived from the above recorded features. In certain embodiments, the customer data 192 is stored in a form of a database, and retrieving of certain customer data is possible through the interaction between the computing device 110 and the database 192. In certain embodiments, the customer data 192 may be collected and stored by the customer data manager 118, or other applications of the e-commerce platform.

The transaction data 194 is accessible to the computing device 110, and stores transactions on the e-commerce platform. Each transaction may include, for example, the time of the transaction, the shipping address of the transaction, the customer involved in the transaction, the identification of one or multiple products in the transaction, the total cost or spending of the transaction, the gross profit of the transaction, whether any promotion is used in the transaction, and the type of shipping methods of the products. In certain embodiments, the transaction data 194 is stored in a form of a database, and retrieving of certain transaction data is possible through the interaction with the database. In certain embodiments, the system 100 may further include product data which stores information of the products provided by the e-commerce platform.

The CLV 196 is accessible to the computing device 110, and stores CLVs of customers. In certain embodiments, the computing device 110 is configured to generate CLVs at different time intervals, and store the generated CLVs in the CLV 196. The time interval, for example, can be one day, a few days, or a week. Accordingly, each customer in the CLV 196 may have many CLVs recorded for different times. In certain embodiments, the most recent CLVs of a customer stored in the CLV 196 is the current CLV of the customer.

As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, solid-state drive (SSD) or any other types of data storage devices. In certain embodiments, the storage device 116 may be a local storage, a remote storage, or a cloud storage. In certain embodiments, the computing device 110 may have multiple storage devices 116, which may be identical storage devices or different types of storage devices, and the applications of the computing device 110 may be stored in one or more of the storage devices 116 of the computing device 110. In certain embodiments, the computing device 110 is a cloud computer, and the processor 112, the memory 114 and the storage device 116 are shared resources provided over the Internet on-demand.

As shown in FIG. 1, the storage device 116 includes a customer lifetime value (CLV) manager 118. The CLV manager 118 is configured to predict CLVs of customers, push advertisement to the customers based on their CLVs, and provide benefit packages to the customers based on their CLVs. The customer CLV manager 118 includes, among other things, a customer feature generator 120, a classifier 130, a regressor 140, a customer classifying module 150, a customer CLV predictor 160, a marketing module 170, a customer retaining module 180, and a managing interface 190. In certain embodiments, the customer CLV manager 118 may include other applications or modules necessary for its operation. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the customer CLV manager 118 may be located at a remote computing device or distributed in cloud.

Figure 2A:
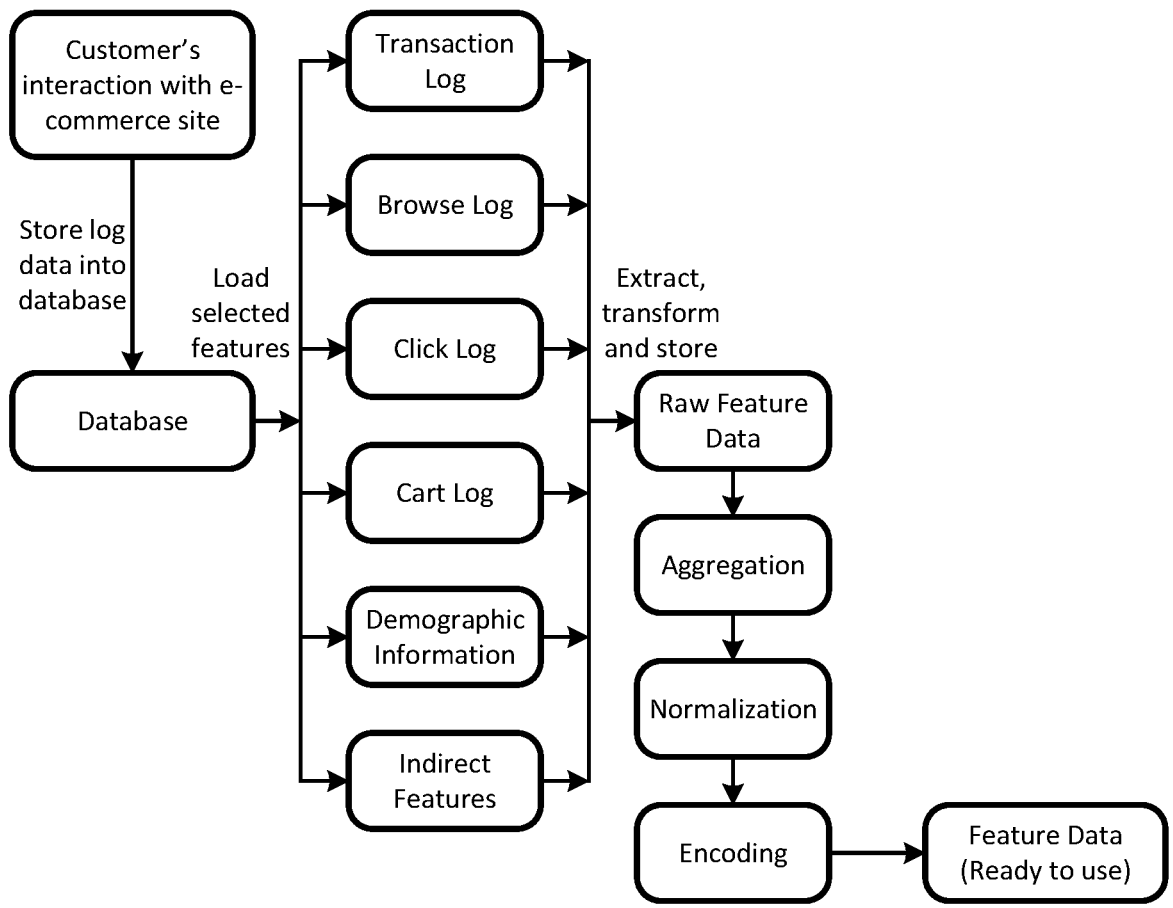
FIG. 2A schematically depicts a customer feature generator according to certain embodiments of the present disclosure.

The customer feature generator 120 is configured to, in response to a request by the managing interface 190, retrieve customer and transaction data stored in the customer data 192 and transaction data 194, process the retrieved data to obtain customer feature data and customer classifier and regressor labels, and send the customer feature data and/or customer labels to the classifier 130, the regressor 140, the customer classifying module 150, and/or the customer CLV predictor 160. The disclosure needs customers' feature data for classifier/regressor training and CLV prediction, and as shown in FIG. 2A, the detailed customer activity data through the customers' interaction with the e-commerce platform is stored in activity logs. These logs may be stored in the database 192 or database 194. Some of the features can be retrieved directly from activity logs, such as transaction history (number of orders, the value/spending of the orders, order dates, etc.), engagement (browse, click, add-to-cart, etc.) and demographic information based on customers' registration. In addition, the disclosure can add some indirect features based on direct features, e.g., days since the last order, days since the first order, purchase frequency, etc. After having the raw feature data, the disclosure can aggregate them by month, quarter, or year, e.g., number of clicks in each month from January to December, number of clicks in each quarter or number of clicks in the last year. Since the raw features spanning vary in terms of magnitude and range, the magnitude and range may affect prediction performance. Therefore, normalization and encoding are applied to the raw features before the training process to improve overall performance.

Figure 2B:
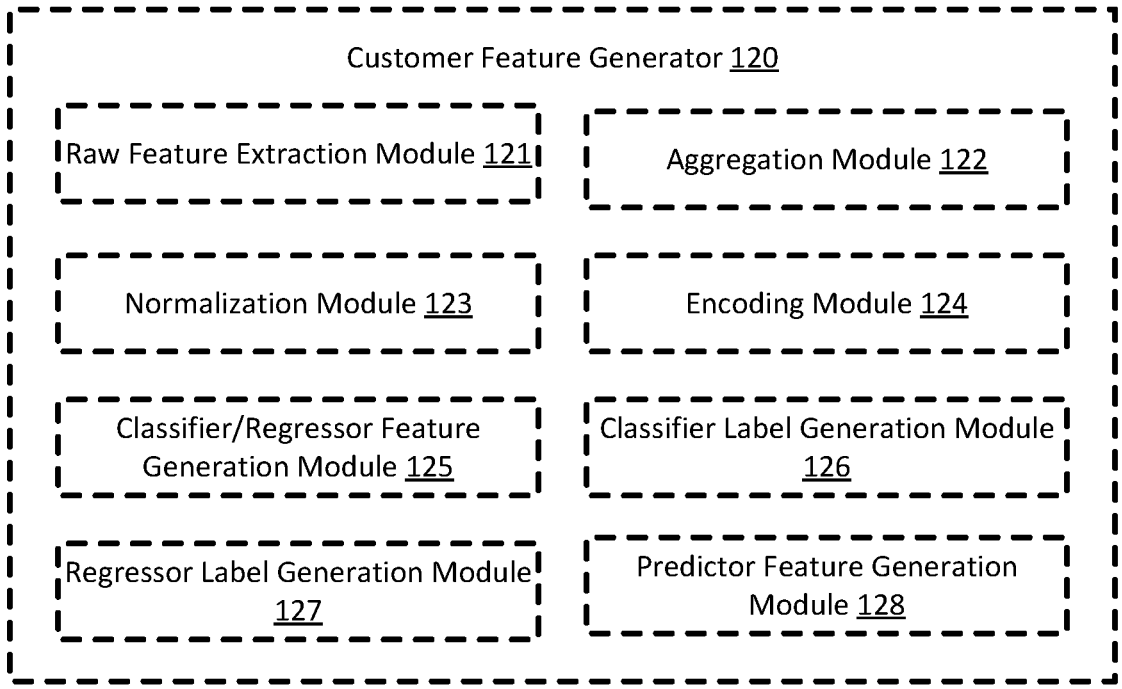
FIG. 2B schematically depicts customer feature generator according to certain embodiments of the present disclosure.

In certain embodiments, as shown in FIG. 2B, the customer feature generator 120 includes a raw feature extraction module 121, an aggregation module 122, a normalization module 123, an encoding module 124, a classifier/regressor feature generation module 125, a classifier label generation module 126, a regressor label generation module 127, and a predictor feature generation module 128. In certain embodiments, the modules in FIG. 2B is configured to perform the process shown in FIG. 2A.

Figure 2C:
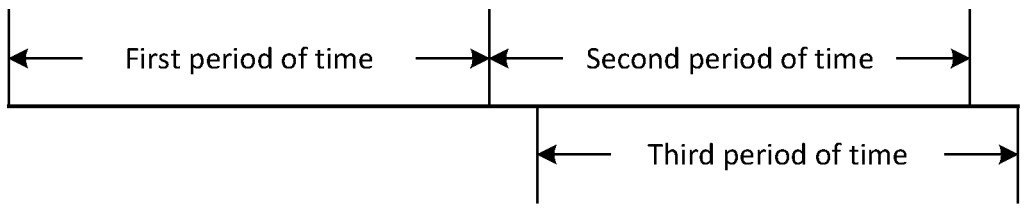
FIG. 2C schematically depicts time frames used in certain embodiments of the present disclosure.

The raw feature extraction module 121 is configured to extract the raw data from the customer data 192 and the transaction data 194, and send the extracted raw data to the aggregation module 122 or the encoding module 124. In certain embodiments, the extracted raw data includes, for example as described above, the number of orders, the value of orders, the order dates, the browse log, the click log, the add-to-cart log, the shipping address, the purchase frequency. In certain embodiments, the extracted raw data includes indirect features of purchasing frequency, where the raw feature extracting module 121 would determine the date for a customer's first order, the date for the customer's most recent order, and the total number of the customer's orders, and dividing the total number of the customer's order by the number of days from the date of the first order to the date of the most recent order. In certain embodiments, the extracted raw data includes indirect features of time period to the most recent purchase date, where the raw feature extracting module 121 would determine the date for the customer's most recent order, and the number of date from the current date to the date having the most recenter order. In certain embodiments, the raw data are extracted from the data collected in a first period of time, a second period of time, or a third period of time as shown in FIG. 2C, where the first period of time is earlier than the second period of time and third period of time, the second period of time is the same as or earlier than the third period of time. In certain embodiments, the customer feature extracted from the first period of time is used as the input for training the classifier 130 and the regressor 140; the customer feature extracted from the second period of time is used as labels for training the classifier 130 and the regressor 140; and the customer features extracted from the third period of time is used as input for the customer classifying module 150 and the customer CLV predictor 160. In one example, the current time is May 19, 2021, the first period of time is May 1, 2019 to Apr. 30, 2020, the second period of time is May 1, 2020 to Apr. 1, 2021, and the third period of time is May 20, 2020 to May 19, 2021. Kindly note that the length of the second period of time may vary according to business requirement. In certain embodiments, an one year period is sufficient for predicting the future value of the customers. In certain embodiments, the second period can be 90 days or 30 days. In certain embodiments, the second period of time is set at one year, 90 days, and 30 days, and the result from the three different time length can be used together.

The aggregation module 122 is configured, upon receiving the extracted number of orders from the raw data extracting module 121, aggregate the number of orders in a predefined time frames, and send the aggregated number of orders to the classifier/regressor feature generation module 125 (when raw data are extracted from the first period of time), or the predictor feature generation module 128 (when raw data are extracted from the third period of time). The predefined time frames may be, for example, one month, one season (three months), and one year. Therefore, the features for the number of orders in an one-year period may include 17 values, 12 monthly number of orders, 4 seasonally number of orders, and one year number of orders for a customer. Similarly, the aggregation 122 is configured to aggregate the number of days that have orders, the number of browses, the number of clicks and the number of add-to-cart actions at different time frames, such as months, seasons and year, and send the aggregated features to the to the classifier/regressor feature generation module 125 (when raw data are extracted from the first period of time), or the predictor feature generation module 128 (when raw data are extracted from the third period of time). In certain embodiments, when the extracted raw data is the value (or the cost, or the spending) of the orders, the aggregation module 122 is configured to aggregate the spendings at different time frames, and send the aggregated spendings to the normalization module 123.

The normalization module 123 is configured to, upon receiving the aggregated spendings of orders at different time frames, such as monthly, seasonally, and year, normalize the spendings, and send the normalized spendings to the classifier/regressor feature generation module 125, the classifier label generation module 126, the regressor label generation module 127, or the predictor feature generation module 128. The normalization of the values may be performed, for example, by calculating a log transformation of the spendings. For example, an order valued at $100 is normalized to the number 2 after log function with base 10, and an order value at $1,000,000 is normalized to the number 6 after log function with base 10. In certain embodiments, the normalization may be performed using rescaling (min-max normalization), mean normalization, or other standardization (Z-score normalization). In certain embodiments, the normalization module 123 is configured to send only the aggregated and normalized year spending during the second period of time to the classifier label generation module 126 and the regressor label generation module 127, but not the monthly or seasonal spendings. In certain embodiments, the normalization module 123 is further configured to normalize other aggregated features, such as the aggregated number of orders, aggregated number of browses, the aggregated number of clicks, the aggregated number of add-to-cart actions, etc. However, there is no need to perform normalization on the demographic information.

The encoding module 124 is configured to, upon receiving certain extracted raw data from the raw feature extraction module 121, encode the extracted raw data to obtain encoded features, and send the encoded features to the classifier/regressor feature generation module 125 (when raw data are extracted from the first period of time), or the predictor feature generation module 128 (when raw data are extracted from the third period of time). In certain embodiments, the extracted raw data subjected to encoding are demographic information such as registration address, shipping address, gender, and age of the customers. In certain embodiments, the encoding is performed by one-hot encoding. For example, the cities of the registration address or shipping address may be divided into six levels, and the levels are encoded as 100000, 010000, 001000, 000100, 000010, and 000001, respectively. In another example, the gender man is encoded as 10, and the gender woman is encoded as 01. In a further example, the age <18 is encoded as 1000, the age 18-34 is encoded as 0100, the age 35-50 is encoded as 0010, and the age >50 is encoded as 0001.

The classifier/regressor feature generation module 125 is configured to, upon receiving the data from the raw feature extraction module 121, the aggregation module 122, the normalization module 123, and the encoding module 124, combine the data to obtain customer feature data (or customer features), and send the customer feature data to the classifier 130 and the regressor 140. During training, the data are derived from the first period of time, and during prediction, the data are derived from the third period of time. The data received from the raw feature extraction module 121 includes the purchase frequency and the time period to the most recent purchase. The data received from the aggregation module 122 includes the number of orders, the number of days having orders, the number of browses, the number of clicks, and the number of add-to-cart actions, each may contain 17 values. The data received from the normalization module 123 includes the aggregated and normalized spendings of the orders. The data received from the encoding module 124 includes the registration address, the shipping address, the gender, and the age of the customers. In certain embodiments, the customer feature data is in a form of a vector having multiple dimensions, and each of the dimensions has a value representing one of the customer features. In certain embodiments, the vector has about 250 different features.

The classifier label generation module 126 is configured to, upon receiving the aggregated and normalized order spendings during the second period of time, make classifier labels for the customers, and send the classifier labels to the classifier 130. The classifier label has a value of 0 or 1, where the value of the classifier label is 0 when the aggregated and normalized spending of a customer is 0, and the value of the classifier label is 1 when the aggregated and normalized order is greater than 0. In certain embodiments, the classifier label generation module 126 may also be configured to make the classifier label using the aggregated spendings from the aggregation module 122, instead of using the aggregated and normalized value from the normalization module 123.

The regressor label generation module 127 is configured to, upon receiving the aggregated and normalized order spendings during the second period of time, make regressor labels for the customers, and send the regressor labels to the regressor 140. When a aggregated and normalized order spending is 0 for a customer, the regressor label generation module 127 does not create regressor label for the customer. When the aggregated and normalized order spending is greater than 0 for a customer, the regressor label generation module 127 uses the aggregated and normalized order spending as the regressor label. Thus, the number of regressor labels is less than the number of total customers because the customers do not have regressor labels if they do not make any orders during the second period of time.

The predictor feature generation module 128 basically has the same function as the classifier/regressor feature generation module 125, the difference is that the predictor feature generation module 128 is configured to use the feature data derived during the third period of time, instead of the first period of time, and after preparation of the customer feature data, the predictor feature generation module 128 is configured to send the customer feature data to the customer classifying module 150.

Referring back to FIG. 1, the classifier 130 is configured to, upon receiving the customer feature data during the first period of time from the classifier/regressor feature generation module 125 and the classifier label during the second period of time from the classifier label generation module 126, train the classifier to make binary predictions. Since the second period of time is a future time relative to the first period time, the binary prediction of the classifier 130 would be a prediction for the future. For example, as described above, the first period of time could be May 1, 2019 to Apr. 30, 2020, and the second period of time could be May 1, 2020 to Apr. 1, 2021. In certain embodiments, the classifier 130 adopts Random Forrest (RF) approach. The classifier 130 is well-trained when the prediction using the customer feature data derived from the first period of time is the same as or close enough to the classifier labels derived from the second period of time.

The regressor 140 is configured to, upon receiving the customer feature data during the first period of time from the classifier/regressor feature generation module 125 and the regressor labels during the second period of time from the regressor label generation module 127, delete the customer feature data that does not have a corresponding one of the regressor labels, such that the number of retained customer feature data and the number of regressor labels have one-to-one correspondence, and train the regressor using the one-to-one corresponding customer feature data during the first period of time and the regressor labels during the second period of time. In certain embodiments, the deletion of the customers may also be based on the performance of the classifier 130, where the customers have a classifier label or a predicted classifier label of 0 is deleted before training the regressor 140. Since the second period of time is the future time relative to the first period time, the prediction of the regressor 140 would be a prediction for the future. For example, as described above, the first period of time could be May 1, 2019 to Apr. 30, 2020, and the second period of time could be May 1, 2020 to Apr. 1, 2021. In certain embodiments, the regressor 140 adopts Gradient Boosting Decision Tree (GBDT) approach. The regressor 140 is well-trained when the prediction using the customer feature data derived from the first period of time is the same as or close enough to the regressor labels derived from the second period of time.

The customer classifying module 150 and the customer CLV predictor 160 are configured to call the operation of the classifier 130 and the regressor 140—after well-training of the classifier 130 and the regressor 140, and the performance of the customer classifying module 150 and the customer CLV predictor 160 are configured to make the prediction of the customer CLVs using a two-stage prediction.

The customer classifying module 150 is configured to, upon receiving the customer feature data during the third period of time from the customer feature generator 120, call the classifier 130 to use the customer feature data to make predictions of whether the customer have a positive CLV value or 0, confer the CLV value of 0 to the customers having a predicted classifier label of 0, and send the customers having the positive values to the customer CLV predictor 160. In certain embodiments, the customer classifying module 150 is further configured to store the customers and their CLV value of 0 to the CLV 196. The customers predicted to have a classifier label of 0 is also named inactive customers, and the customers predicted to have a classifier label of 1 is also named active customers.

The customer CLV predictor 160 is configured to, upon receiving the customers predicted by the classifier 130 to have the positive CLV values (active customers), retrieve or receive customer feature data from the customer feature generator 120 corresponding to the active customers, call the regressor 140 to use the retrieved customer feature data to make predictions of their CLV values, and store the active customers and their CLV values to the CLV 196.

Figure 3:
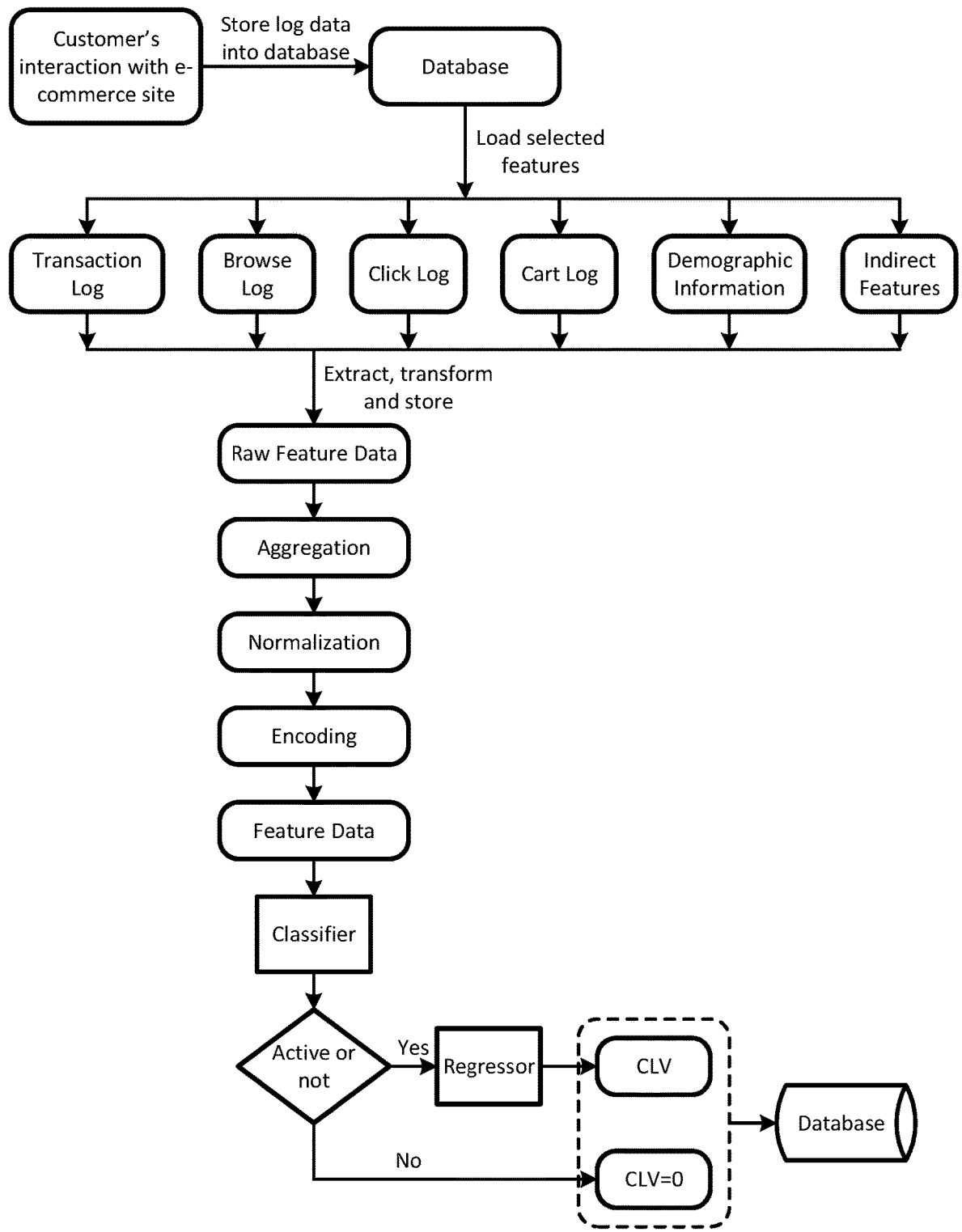
FIG. 3 schematically depicts a customer lifetime value prediction pipeline according to certain embodiments of the present disclosure.

Kindly note that the prediction is a two stage process. The customer classifying module 150 (the classifier) performs the first stage, directly gives a zero CLV to the inactive customers, and passes the active customer to the customer CLV predictor 160. At the second stage, the customer CLV predictor 160 (the regressor) predicts a precise CLV value to each customer that have the positive CLV in the first stage. In certain embodiments, the customer classifying module 150 and the customer CLV predictor 160 store the CLVs of the customers to the CLV 196, and the CLV 196 is a data store such as Apache Hive. This data is then to be consumed by downstream system used to prioritize customer service, targeting marketing campaigns, etc. FIG. 3 schematically illustrate the prediction process after training of the classifier and the regressor.

The marketing module 170 is configured to retrieve customers and their current CLVs from the CLV 196, provide a marketing strategy to select customers based on the CLVs, and perform the marketing strategy toward the selected customers. In certain embodiments, the marketing strategy is an advertising strategy. For a product of luxury brand, the marketing module 170 is configured to select a predefined percentage of customers having top CLV values, and present the advertisement to the predefined percentage of the customers. The predefined percentage may be, for example, top 5%, top 10%, top 20%, or top 30%. In certain embodiments the percentage is calculate from all the customers. In certain embodiments, the percentage is calculated from only the customers having the positive CLV values. For a product targeting youth, the marketing module 170 is configured to select customers having CLV values in a predefined range, such as 40%-60%, or 50%-55% of CLV values of all the customers, or of the customers having the positive CLV values.

The customer retaining module 180 is configured to retrieve customers and their current CLVs from the CLV 196, and provide a strategy to promote actions of the low activity customers. In certain embodiments, the customer retaining module 180 is configured to send a promotion to the customers having the CLV values of 0. In certain embodiments, the customer retaining module 180 is configured to send a promotion to the bottom 5%, 10%, 15%, or 20% of the customers having the positive CLV values. The promotion may include, for example, a red packet, free shipping, or a percentage off from product price. In certain embodiments, CLVs are predicted in different time intervals, and the CLVs of the same customer at different times are compared. When the CLVs of a customer in a predetermined period of time decreases, the customer retaining module 180 is configured to send promotions to those customers, so that the customers will increase their activities on the e-commerce platform.

The managing interface 190 is configured to provide an interface for an administrator of the customer CLV manager 118 to define customer features to be extracted, the parameters for data aggregation, normalization and encoding, to define the training frequency of the classifier and the regressor, to define operating frequency of the customer classifying module 150 and the customer CLV predictor 160, and to provide marketing and customer retaining strategies, etc.

The customer CLV values 196 is configured to store the predicted CLV values of the customers. In certain embodiments, the stored CLV values may include CLV values of the customers at different times, such as daily records of the predicted CLV values. The CLVs stored in the CLV 196 are accessible by the marketing module 170 and the customer retaining module 180.

Figure 4:
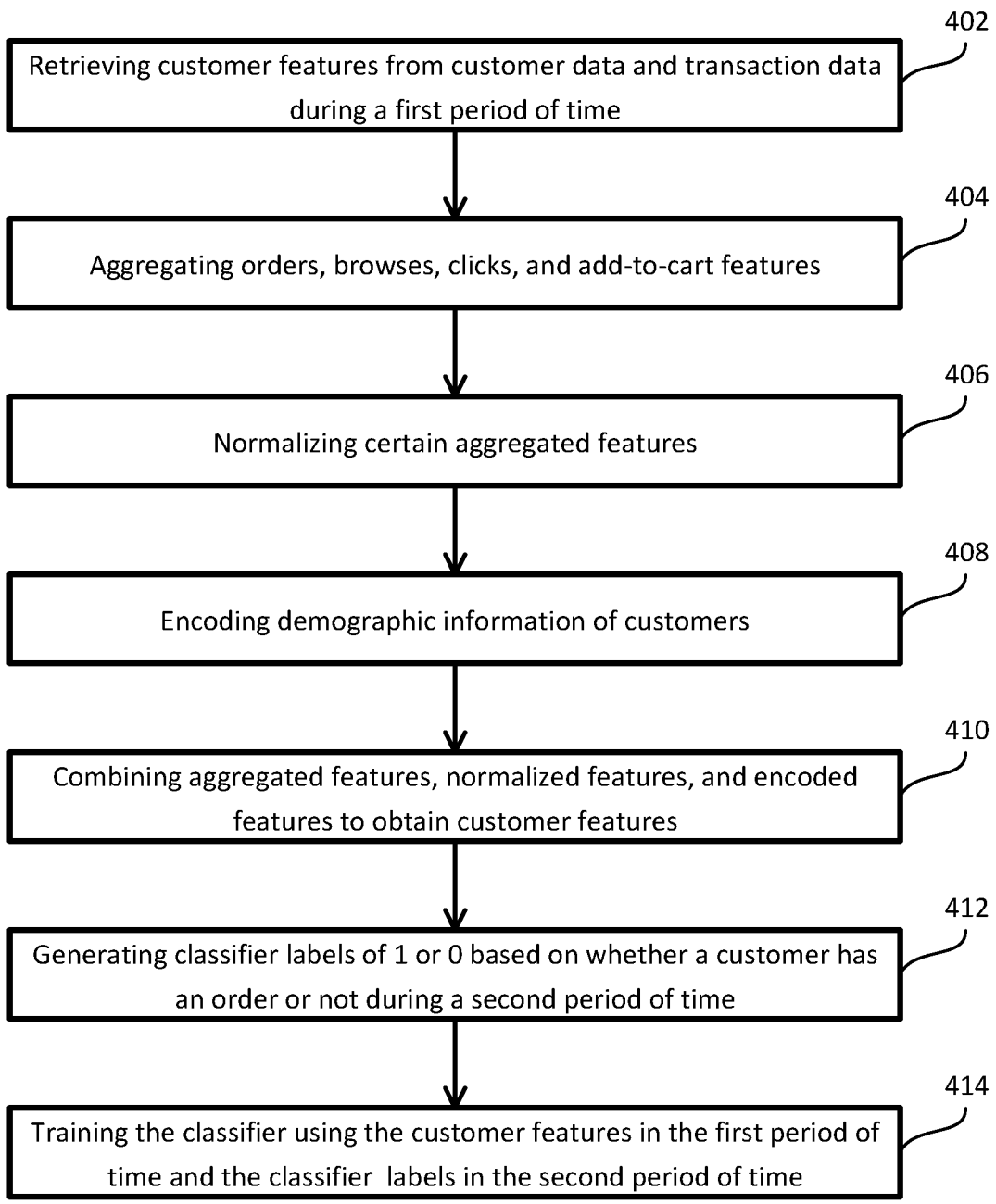
FIG. 4 schematically depicts a method for training a classifier according to certain embodiments of the present disclosure.

In certain aspects, the present disclosure relates to a method for managing and using customer lifetime value. FIG. 4 schematically depict a method for training a classifier 130 according to certain embodiments of the present disclosure. In certain embodiments, the method is implemented by the computing device 110 shown in FIG. 1. In certain embodiments, the method shown in FIG. 4 corresponds to the function of the customer lifetime value manager 118, and specifically the customer feature generator 120 and the classifier 130. It should be particularly noted that, unless otherwise stated in the present disclosure, the steps of the method may be arranged in a different sequential order, and are thus not limited to the sequential order as shown in FIG. 4.

At procedure 402, the raw feature extraction module 121 extracts customer features from the customer data 192 and the transaction data 194 during the first period of time, and sends the extracted data during the first period of time to the aggregation module 122 or the encoding module 124 according to the type of the customer features. The first period time may be, for example, May 1, 2019 to Apr. 30, 2020. The raw feature sent to the aggregation module 122 may include, for example, transaction log recording time and value of each order, browse log recording time and web address of each browse, click log recording time and web address of each click, and add-to-cart recording time and value of each add-to-cart action. The raw feature sent to the encoding module 124 may include, for example, registration address, shipping address, gender, and age of the customers.

At procedure 404, upon receiving related raw data during the first period of time from the raw feature extraction module 121, the aggregation module 122 aggregates the number of orders, the spendings/values of the orders, the number of days having orders, the number of browses, the number of clicks, the number of add-to-cart actions at months, seasons (quarters), and year, and sends the aggregated spending of the orders to the normalization module 123, and sends the rest of the aggregated values to the classifier/regressor feature generation module 125. Therefore, for a one year of the first period of time, each above feature would include 17 different aggregation values, 12 monthly aggregation values, four seasonal aggregation values, and one yearly value.

At procedure 406, upon receiving the aggregated spendings of orders at months, seasons, and year during the first period of time, the normalization module 123 normalizes the aggregated spendings to obtain normalized spendings, and sends the normalized spendings during the first period of time to the classifier/regressor feature generation module 125.

At procedure 408, upon receiving the registration address, shipping address, gender, and age of the customers from the raw feature extraction module 121, the encoding module 124 encodes the features, and sends the encoding to the classifier/regressor feature generation module 125. In certain embodiments, the encoding is unbiased.

At procedure 410, upon receiving the aggregated features, the normalized features, and encoded features during the first period of time, the classifier/regressor feature generation module 125 combines these features to obtain customer features, and sends the customer features to the classifier 130.

At procedure 412, the raw feature extraction module 121 retrieves transaction log during the second period of time, and sends the retrieved transaction data to the aggregation module 122. The second period of time may be, for example, May 1, 2020 to Apr. 30, 2021, and the transaction log records time and value of each order. Then the aggregation module 122 aggregates the spendings of orders during the second period of time (a year), and sends the aggregated spending of orders of the customers to the normalization module 123; the normalization module 123 normalizes the aggregated spendings of the customers, and sends the normalized spendings to the classifier label generation module 126; the classifier label generation module 126 generates a classifier label of 1 if the normalized spending for a customer is greater than 0, generates a classifier label of 0 if the normalized spending for a customer is 0, and sends the classifier labels to the classifier 130. In certain embodiments, there is no need to normalize the order values/spendings to create the classifier labels. Therefore, the aggregation module 122 may send the aggregated order values during the second period of time directly to the classifier label generation module 126 instead of sending the aggregated order values to the normalization module 123. Further, there is no need to aggregate at monthly or seasonal time frame, and only a total order value during the second period of time is needed. In addition, the processes at procedure 412 may also be combined with the procedures 402 to 410, as long as the data from the first period of time and the second period of time is separated processed. In certain embodiments, the length of the second period of time could be one year, 90 days, and/or 30 days.

At procedure 414, upon receiving the customer features from the classifier/regressor feature generation module 125 and the classifier labels from the classifier label generation module 126, the classifier 130 trains the classifier model using the customer feature as input and the classifier labels as target, until the classifier 130 is well trained. Kindly note that the customer features used are derived from data collected during the first period of time, the classifier labels are derived from data collected during the second period of time, and the first period of time is earlier than the second period of time. Therefore, the classifier predictions is forward-looking.

Figure 5:
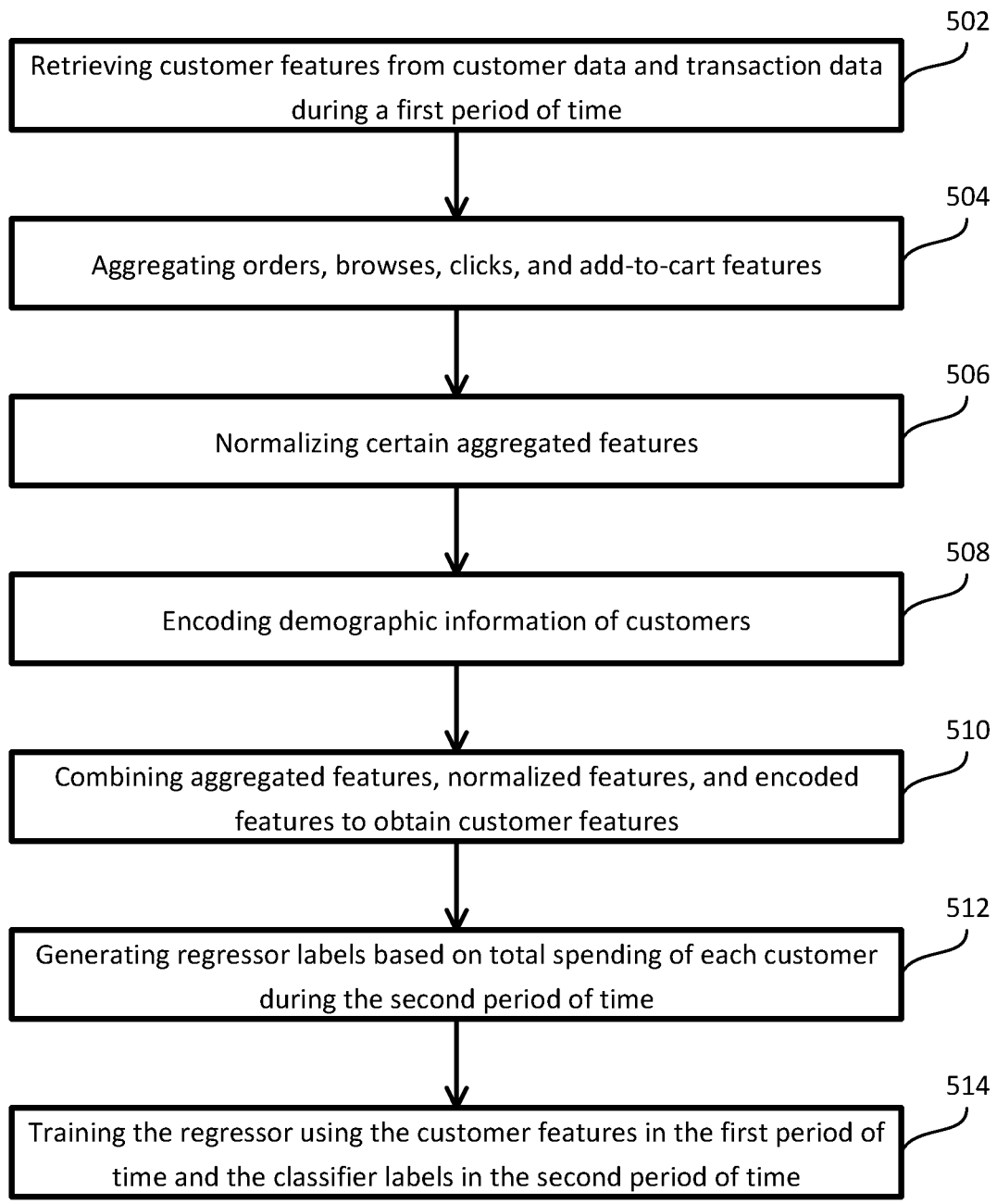
FIG. 5 schematically depicts a method for training a regressor according to certain embodiments of the present disclosure.

FIG. 5 schematically depict a method for training a regressor 140 according to certain embodiments of the present disclosure. In certain embodiments, the method is implemented by the computing device 110 shown in FIG. 1. In certain embodiments, the method shown in FIG. 5 corresponds to the function of the customer lifetime value manager 118, specifically the customer feature generator 120 and the regressor 140. It should be particularly noted that, unless otherwise stated in the present disclosure, the steps of the method may be arranged in a different sequential order, and are thus not limited to the sequential order as shown in FIG. 5.

As shown in FIG. 5, the procedures 502-514 of the method 500 are similar to the procedures 402-414 of the method 400. The main difference is that the regressor 140 uses the normalized order spendings as labels (instead of classifier labels 0 and 1), and the training is performed on the regressor 140 (instead of training the classifier 130). Further, since the regressor 140 uses only the customers having positive spendings during the second period of time, the customer features and regressor labels correspond to each other and are derived from only a subset of the customers (active customers). In certain embodiments, the method 500 may further include a filter procedure to remove the feature data for the inactive customers who do not have any order at all during the second period of time.

Because all the data during the first and second period of time are available, the training of the classifier 130 and the regressor 140 can be performed separately or in parallel. In certain embodiments, the customer features for training the classifier 130 and the regressor 140 are generated at the same time because the customer features used by the classifier 130 and the regressor 140 can be the same except that the regressor 140 only uses data from active customers, who have place orders during the second period of time.

In certain embodiments, the training of the classifier 130 and the regressor 140 may be performed sequentially, and the customers having classifier labels of 1 predicted by the well-trained classifier 130 are used for training the regressor 140. However, the method shown in FIG. 5 may be preferred since it uses the customers having ground truth positive order spendings.

Figure 6:
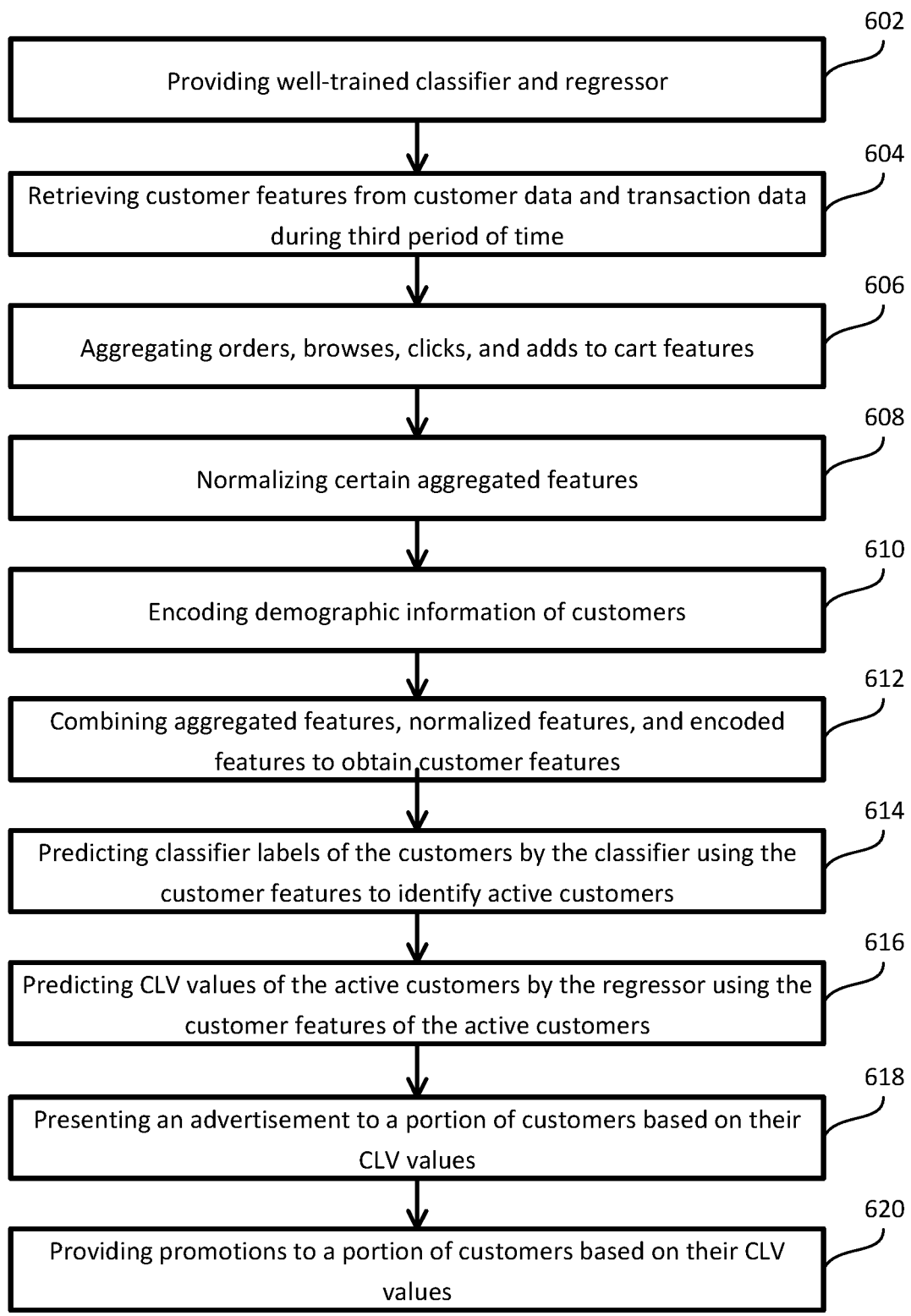
FIG. 6 schematically depicts a method for predicting and using customer lifetime values according to certain embodiments of the present disclosure.

FIG. 6 schematically depict a method for predicting and using customer CLVs according to certain embodiments of the present disclosure. In certain embodiments, the method is implemented by the computing device 110 shown in FIG. 1. In certain embodiments, the method shown in FIG. 6 corresponds to the function of the customer lifetime value manager 118 shown in FIG. 1. It should be particularly noted that, unless otherwise stated in the present disclosure, the steps of the method 600 may be arranged in a different sequential order, and are thus not limited to the sequential order as shown in FIG. 6. Further, the method 600 shown in FIG. 6 is performed after well training of the classifier 130 and the regressor 140.

At procedure 602, a well-trained classifier 130 and a well-trained regressor 140 are provided, where the classifier 130 may be trained using the method 400 shown in FIG. 4, and the regressor 140 may be trained using the method 500 shown in FIG. 5.

At procedure 604, the customer classifying module 150 calls the raw feature extraction module 121 to retrieve customer features from the customer data 192 and the transaction data 194 during the third period of time, and sends the retrieved data to the aggregation module 122 or the encoding module 124 according to the type of the customer features. The third period time may be, for example, May 20, 2020 to May 19, 2021. The raw feature sent to the aggregation module 122 may include, for example, transaction log recording time and value of each order, browse log recording time and web address of each browse, click log recording time and web address of each click, and add-to-cart recording time and value of each add-to-cart action. The raw feature sent to the encoding module 124 may include, for example, registration address, shipping address, gender, and age of the customers.

At procedure 606, upon receiving related raw data during the third period of time from the raw feature extraction module 121, the aggregation module 122 aggregates the number of orders, the spending/value of the orders, the number of days having orders, the number of browses, the number of clicks, the number of add-to-cart at months, seasons, and year, and sends the aggregated values of orders to the normalization module 123, and sends the rest of the aggregated values to the classifier/regressor feature generation module 125.

At procedure 608, upon receiving the aggregated values of orders at months, seasons, and year during the third period of time, the normalization module 123 normalizes the aggregated values to obtain normalized customer features, and sends the normalized customer features during the third period of time to the classifier/regressor feature generation module 125.

At procedure 610, upon receiving the registration address, shipping address, gender, and age of the customers from the raw feature extraction module 121, the encoding module 124 encodes the features, and sends the encoding to the classifier/regressor feature generation module 125.

At procedure 612, upon receiving the aggregated features, the normalized features, and encoded features during the third period of time, the classifier/regressor feature generation module 125 combines these features to obtain customer features, and sends the customer features to the customer classifying module 150.

At procedure 614, upon receiving the customer features from the classifier/regressor feature generation module 125, the customer classifying module 150 calls the classifier 130 to predict classifier labels for the customers based on the customer features, identifies active customers having the classifier label of 1, and sends the active customers to the customer CLV predictor 160. Kindly note that the classifier label will have a value of 1 or 0, the customers having the classifier label of 1 are named the active customers, and the customers having the classifier label of 0 are named the inactive customers. The active customers may be in a form of a list of identification (ID) of those customers. In certain embodiments, the customer classifying module 150 further confers a CLV value of 0 to the inactive customers, and stores the inactive customers and their CLV value of 0 in the customer CLV values 196.

At procedure 616, upon receiving the active customers from the customer classifying module 150, the customer CLV predictor 160 retrieves customer features of the active customers from the classifier/regressor feature generation module 125, and calls the regressor 140 to make prediction of customer CLV values based on the customer features of the active customers, and stores the CLV values of the active customers in the CLV 196.

At procedure 618, when the CLV values of the customers are available in the CLV 196, the marketing module 170 retrieves the customer CLV values, designs a marketing strategy targeting a portion of the customers based on character of an advertisement, and sends the advertisement to the portion of the customers. For example, the marketing module 170 may push a product of luxury brand to customers having top 20% of the CLV values of all the customers or the customers having positive CLV values, and push a product targeting youth to customers in the range of 50%-55% of the CLV values of all the customers or the customers having the positive CLV values.

At procedure 620, when the CLV values of the customers are available in the CLV 196, the customer retaining module 180 retrieves the customer CLV values, design a customer retaining strategy targeting a portion of the customers based on their CLV values, and sends promotions to the portion of the customers. The portion of the customers may be the customers having CLV values of 0, or the customers having bottom 10% or 20% of the CLV values in all the customers having positive CLV values. In certain embodiments, CLV values of the customers varies at different times. The customer retaining module 180 may monitor the changes of the CLV values of the customers, and provide promotions to the customers having significant CLV value decreases in a fourth period of time. The significant change may be a >20% decrease, or a >50% decrease, or more, and the fourth period of time may be a week, a month, three months, or half a year.

In certain embodiments, the training of the classifier 130 and the regressor 140 using the method 400 and 500 is performed regularly, for example, once a month. In certain embodiments, the prediction of the CLV values by the customer classifying module 150 and the customer CLV predictor 160 is performed regularly, for example, in a daily basis.

In the above embodiments described in the methods 400, 500, and 600, the predicted CLV values is the CLV value of the customers in the future one year. In certain embodiments, the first, second, and third period of times may vary, and the CLV prediction can also be made, for example, to provide prediction of the customers CLV values in the next month, the next season, the next half year, the next two years, the next three years, the next five years, or the lifetime of the customers.

In another aspect, the present disclosure relates to a non-transitory computer readable medium storing computer executable code. The code, when executed at a processor of a computing device, may perform the methods as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, through a proper configured workflow scheduler system such as Oozie, all the four pipelines (feature collection and generation pipeline, classifier generation pipeline, regressor generation pipeline, prediction pipeline) can be operated automatically in a suitable period. For example, it's not necessary to run the classifier generation pipeline or the regressor generation pipeline daily since the performance of the models are relative stable for months. To this end, the disclosure can operate them monthly or quarterly. For the prediction pipeline, the disclosure may operate it daily or weekly to maintain up to date CLV for each customer according to different business requirement.

In practice, the CLV system of the present disclosure updates all the exist customers' CLV (includes new registered customers) daily, the system updates classifier and regressor quarterly, and the system has been operating stably.

An accurate CLV at individual level has significant commercial value. CLV can not only help to make marketing recommendation, but also optimize resource allocation. One of the most popular application, advertisers can advertise products to more targeted customers according to their CLV, e.g., recommend products with higher prices to higher CLV customers, and recommend products with lower prices to lower CLV customers. This can greatly improve the return on investment. If the CLV of customers are observed decreased, the platform can retain these potential lost customers by issuing coupons or other incentives. CLV can also help identify which customers are more likely to acquire or which customers are more likely to retention, and so on.

In certain aspects, of the over 200 features, the present disclosure identifies top 10 most important features, which include (1) numbers of lifetime order, (2) how many days ordered in the last year, (3) numbers of order in the last year, (4) numbers of click in the last month, (5) numbers of browse in the last month, (6) numbers of browse in the last year, (7) numbers of click in the last year, (8) numbers of items adding to cart in the last quarter, (9) total value of lifetime order, and (10) total value of order in the last year. In certain embodiments, the present disclosure restrict the customer features from the over 200 features to the 10 most important features, which improves efficiency of CLV prediction without sacrifice too much of the accuracy.

In certain embodiments, the present disclosure compares the two-stage prediction system with a single step prediction system. In the single step prediction system, the classifier is removed. As shown in FIG. 7, the two-stage system of the disclosure is advantageous over the single step system whether evaluated by MAE or by Spearman correlation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method, comprising:
   providing a classifier of a computing device, wherein the classifier is trained using customer feature data of a first plurality of customers during a first period of time as input and whether there are spendings of the first plurality of customers during a second period of time as classifier labels;
   providing a regressor of the computing device, wherein the regressor is trained using customer feature data of a second plurality of customers during the first period of time as input and amount of spendings of the second plurality of customers during a second period of time as regressor labels, wherein the second plurality of customers is a subset of the first plurality of customers, and the amount of spending of each of the second plurality of customers during the second period of time is positive;
   performing the classifier using customer feature data of a third plurality of customers during a third period of time to obtain predicted classifier labels;
   obtaining a fourth plurality of customers, wherein the fourth plurality of customers is a subset of the third plurality of customers, and the predicted classifier labels of the fourth plurality of customers being positive; and
   performing the regressor using the customer feature data of the fourth plurality of customers during the third period of time to obtain predicted regressor labels, the predicted regressor labels being customer lifetime values (CLVs) of the fourth plurality of customers,
   wherein training the classifier by using the customer feature data of the first plurality of customers during the first period of time as the input and whether there are spendings of the first plurality of customers during the second period of time as the classifier labels comprises:
      retrieving customer features of the first plurality of customers from customer data and transaction data during the first period of time, wherein the customer features of the first plurality of customers comprise orders, browses, clicks and add-to-cart features of the first plurality of customers, and demographic information of the first plurality of customers;
      aggregating the orders, browses, clicks, and add-to-cart features of the first plurality of customers to obtain aggregated features, wherein the aggregated features comprise aggregated spendings of orders;
      normalizing the aggregated spendings of orders to obtain normalized features;
      encoding the demographic information of the first plurality of customers to obtain encoded features;
      combining the aggregated features, the normalized features, and the encoded features to obtain the customer feature data of the first plurality of customers during the first period of time;
generating 1 or 0 as the classifier labels based on whether there are the spendings of the first plurality of customers during the second period of time; and
training the classifier by using the customer feature data of the first plurality of customers during the first period of time and the classifier labels during the second period of time.

2. The method of claim 1, wherein the first period of time is earlier than the second period of time and the third period of time.

3. The method of claim 1, wherein the classifier is performed using Random Forrest, and the regressor is performed using Gradient Boosting Decision Tree (GBDT).

4. The method of claim 1, further comprising sending, by the computing device, a promotion package to a predefined percentage of the fourth plurality of customers having the lowest CLVs.

5. The method of claim 4, wherein the predefined percentage is 10%.

6. The method of claim 1, further comprising presenting an advertisement to a portion of the fourth plurality of customers having a predefined range of the CLVs.

7. The method of claim 6, wherein the predefined range is top 20% of CLVs when the advertisement is a luxury brand, and the predefined range is 50%-55% of CLVs when the advertisement is a brand targeting youth.

8. The method of claim 1, wherein the customer feature data is prepared from transaction log, browse log, click log, cart log, demographic information, and indirect features of the customers.

9. The method of claim 8, wherein the preparation comprises aggregation and normalization of spendings from the transaction log, aggregation of a number of transactions from the transaction log, a number of browses from the browse log, a number of clicks from the click log, a number of add-to-cart actions from the cart log, and encoding of shipping address, gender, and age from the demographic information.

10. The method of claim 9, wherein the aggregation comprises summation of the number of transactions, the number of browses, the number of clicks, and the number of add-to-cart actions in a time of a month, a season, and a year.

11. A system, wherein the system comprises a computing device, the computing device comprises a processor and a storage device storing computer executable code, and the computer executable code, when executed at the processor, is configured to:
provide a classifier of a computing device, wherein the classifier is trained using customer feature data of a first plurality of customers during a first period of time as input and whether there are spendings of the first plurality of customers during a second period of time as classifier labels;
provide a regressor of the computing device, wherein the regressor is trained using customer feature data of a second plurality of customers during the first period of time as input and amount of spendings of the second plurality of customers during a second period of time as regressor labels, wherein the second plurality of customers is a subset of the first plurality of customers, and the amount of spending of each of the second plurality of customers during the second period of time is positive;
perform the classifier using customer feature data of a third plurality of customers during a third period of time to obtain predicted classifier labels;
obtain a fourth plurality of customers, wherein the fourth plurality of customers is a subset of the third plurality of customers, and the predicted classifier labels of the fourth plurality of customers being positive; and
perform the regressor using the customer feature data of the fourth plurality of customers during the third period of time to obtain predicted regressor labels, the predicted regressor labels being customer lifetime values (CLVs) of the fourth plurality of customers,
wherein training the classifier by using the customer feature data of the first plurality of customers during the first period of time as the input and whether there are spendings of the first plurality of customers during the second period of time as the classifier labels comprises:
retrieving customer features of the first plurality of customers from customer data and transaction data during the first period of time, wherein the customer features of the first plurality of customers comprise orders, browses, clicks and add-to-cart features of the first plurality of customers, and demographic information of the first plurality of customers;
aggregating the orders, browses, clicks, and add-to-cart features of the first plurality of customers to obtain aggregated features, wherein the aggregated features comprise aggregated spendings of orders;
normalizing the aggregated spendings of orders to obtain normalized features;
encoding the demographic information of the first plurality of customers to obtain encoded features;
combining the aggregated features, the normalized features, and the encoded features to obtain the customer feature data of the first plurality of customers during the first period of time;
generating 1 or 0 as the classifier labels based on whether there are the spendings of the first plurality of customers during the second period of time; and
training the classifier by using the customer feature data of the first plurality of customers during the first period of time and the classifier labels during the second period of time.

12. The system of claim 11, wherein the first period of time is earlier than the second period of time and the third period of time.

13. The system of claim 11, wherein the classifier is performed using Random Forrest, and the regressor is performed using Gradient Boosting Decision Tree (GBDT).

14. The system of claim 11, wherein the computer executable code is further configured to send a promotion package to 10% of the fourth plurality of customers having the lowest CLVs.

15. The system of claim 11, wherein the computer executable code is further configured to present an advertisement of a luxury brand to a portion of the fourth plurality of customers that have top 20% of the CLVs, or present an advertisement targeting youth to a portion of the fourth plurality of customers having 50%-55% of the CLVs.

16. The system of claim 11, wherein the customer feature data is prepared from transaction log, browse log, click log, cart log, demographic information, and indirect features of the customers, and the preparation comprises aggregation and normalization of spendings from the transaction log, aggregation of a number of transactions from the transaction log, a number of browses from the browse log, a number of clicks from the click log, a number of add-to-cart actions from the cart log, and encoding of shipping address, gender, and age from the demographic information.

17. The system of claim 16, wherein the aggregation comprises summation of the number of transactions, the number of browses, the number of clicks, and the number of add-to-cart actions in a time of a month, a season, and a year.

18. A non-transitory computer readable medium storing computer executable code, wherein the computer executable code, when executed at a processor of a computing device, is configured to:
provide a classifier of a computing device, wherein the classifier is trained using customer feature data of a first plurality of customers during a first period of time as input and whether there are spendings of the first plurality of customers during a second period of time as classifier labels;
provide a regressor of the computing device, wherein the regressor is trained using customer feature data of a second plurality of customers during the first period of time as input and amount of spendings of the second plurality of customers during a second period of time as regressor labels, wherein the second plurality of customers is a subset of the first plurality of customers, and the amount of spending of each of the second plurality of customers during the second period of time is positive;
perform the classifier using customer feature data of a third plurality of customers during a third period of time to obtain predicted classifier labels;
obtain a fourth plurality of customers, wherein the fourth plurality of customers is a subset of the third plurality of customers, and the predicted classifier labels of the fourth plurality of customers being positive; and
perform the regressor using the customer feature data of the fourth plurality of customers during the third period of time to obtain predicted regressor labels, the predicted regressor labels being customer lifetime values (CLVs) of the fourth plurality of customers,
wherein training the classifier by using the customer feature data of the first plurality of customers during the first period of time as the input and whether there are spendings of the first plurality of customers during the second period of time as the classifier labels comprises:
retrieving customer features of the first plurality of customers from customer data and transaction data during the first period of time, wherein the customer features of the first plurality of customers comprise orders, browses, clicks and add-to-cart features of the first plurality of customers, and demographic information of the first plurality of customers;
aggregating the orders, browses, clicks, and add-to-cart features of the first plurality of customers to obtain aggregated features, wherein the aggregated features comprise aggregated spendings of orders;
normalizing the aggregated spendings of orders to obtain normalized features;
encoding the demographic information of the first plurality of customers to obtain encoded features;
combining the aggregated features, the normalized features, and the encoded features to obtain the customer feature data of the first plurality of customers during the first period of time;
generating 1 or 0 as the classifier labels based on whether there are the spendings of the first plurality of customers during the second period of time; and
training the classifier by using the customer feature data of the first plurality of customers during the first period of time and the classifier labels during the second period of time.

19. The non-transitory computer readable medium of claim 18, wherein the classifier is performed using Random Forrest, and the regressor is performed using Gradient Boosting Decision Tree (GBDT).

20. The non-transitory computer readable medium of claim 18, wherein the computer executable code is further configured to:
send a promotion package to 10% of the fourth plurality of customers having the lowest CLVs;
present an advertisement of a luxury brand to the fourth plurality of customers having top 20% of the CLVs; or
present an advertisement targeting youth to the fourth plurality of customers having 50%-55% of the CLVs.

* * * * *